United States Patent [19]
Craig et al.

[11] Patent Number: 4,464,911
[45] Date of Patent: Aug. 14, 1984

[54] ABSORPTION REFRIGERATION CYCLE GENERATOR

[75] Inventors: Laurence B. Craig, Glen Cove; Alfred J. Farina, Baldwin, both of N.Y.

[73] Assignee: Thermocatalytic Corporation, Williston Park, N.Y.

[21] Appl. No.: 471,877

[22] Filed: Mar. 3, 1983

[51] Int. Cl.³ ............................................. F25B 15/00
[52] U.S. Cl. .................................................. 62/476
[58] Field of Search .................. 62/148, 476; 126/92 B

[56] References Cited

U.S. PATENT DOCUMENTS

| | | | |
|---|---|---|---|
| 1,993,764 | 3/1935 | Ullstrand | 62/476 X |
| 3,217,701 | 11/1965 | Weiss | 126/92 B |
| 3,516,264 | 6/1970 | Stierlin | 62/476 X |

FOREIGN PATENT DOCUMENTS 612068  11/1960  Italy ..................................... 62/148

Primary Examiner—Lloyd L. King
Attorney, Agent, or Firm—Bauer & Amer

[57] ABSTRACT

To obtain optimum heat transfer from a heat source to an absorption refrigeration cycle refrigerant, use is made of a doughnut-shaped generator or refrigerant holding tank and a heat source in the specific form of a reactor, as described and illustrated in U.S. Pat. No. 3,217,701, wherein the reactor is located in the central opening of the generator so that the heat which it radiates, which is circumferential in nature, effectively transfers to the refrigerant which is in surrounding relation about the reactor.

4 Claims, 4 Drawing Figures

ABSORPTION REFRIGERATION CYCLE GENERATOR

The present invention relates generally to an improved absorption refrigeration cycle apparatus, and more particularly to improvements in the generating component of this apparatus in which the refrigerant, in response to heat transfer, initiates its phase changes to produce refrigeration.

As understood, the efficiency of a refrigerant of an absorption refrigeration apparatus to produce refrigeration is in part dependent upon the efficiency of heat transfer to it which produces the phase changes in the refrigerant upon which the cycle depends. Presently, this heat transfer is typically achieved using gas burners located adjacent the tank, or so-called generator, containing the liquid refrigerant, and is not conducted at any noteworthy level of efficiency since a significant amount of the heat that is attempted to be transferred to the refrigerant is lost by reflection back from the wall of the generator or lost in hot exhaust gases which bypass the generator, and is subject to other shortcomings.

Broadly, it is an object of the present invention to provide an improved absorption refrigeration cycle generator, in which gas is also used as the heat source, but in which the noted moderate heat transfer efficiency as well as other short-comings of the prior art are overcome. More particularly, it is an object of the present invention to use to optimum advantage a heat source fueled by gas, in which the generated heat emanates circumferentially therefrom and is transferred principally by radiation to the refrigerant which is in encircling relation thereabout, and in which additionally the heat is confined in a chamber in which there is little heat loss due to reflection away from the refrigerant or to unutilized heat energy in the exhaust gases.

The absorption refrigeration cycle involved herein is of the type having an operational mode in which there is transfer of heat resulting from the combustion of an air-gas fuel mixture to a refrigerant fluid. An improved generator achieving said heat transfer, which demonstrates objects and advantages of the present invention, includes a housing constructed of a cooperating pair of external and internal walls bounding a compartment therebetween serving as a storage tank for a body of the refrigerant fluid. Thus, the internal housing wall is located centrally of the storage tank and being of a cylindrical shape is effective to bound a correspondingly cylindrically-shaped internal compartment serving as a combustion chamber within the body of the refrigerant fluid. Serving as the heat source is a cylindrically-shaped combustion unit of the type fueled by an air-gas mixture which is of an appropriate selected size so as to be provided with an operative position disposed in the internal combustion chamber, wherein the flow of radiant and convection heat from the combustion unit is directed circumferentially therefrom and is thereby efficiently transferred to the fluid contents of the storage tank which is in encircling relation about the combustion unit.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 2 is a partial side elevational view illustrating structural details of a combination of components which serve as the generator for said absorption refrigeration cycle;

FIG. 3 is a plan view, in section taken along line 3—3 of FIG. 2 showing additional structural features of said generator; and FIG. 4, like FIG. 2, is a partial side elevational view, but of another embodiment of an improved generator.

BACKGROUND

There are presently known air-cooled units which are operated on an ammonia-water absorption refrigeration cycle, using natural or LP-gas. Ammonia is the refrigerant and an aqueous ammonia solution the absorbent. It is a two-pressure system, the pressure on the high side being in the range of 200 to 300 psig and on the low side in the range of 40 to 60 psig. Pressure separations are maintained during operation by a system of liquid traps, check valves, and restrictors in both the refrigerant and solution lines.

Figure 1:
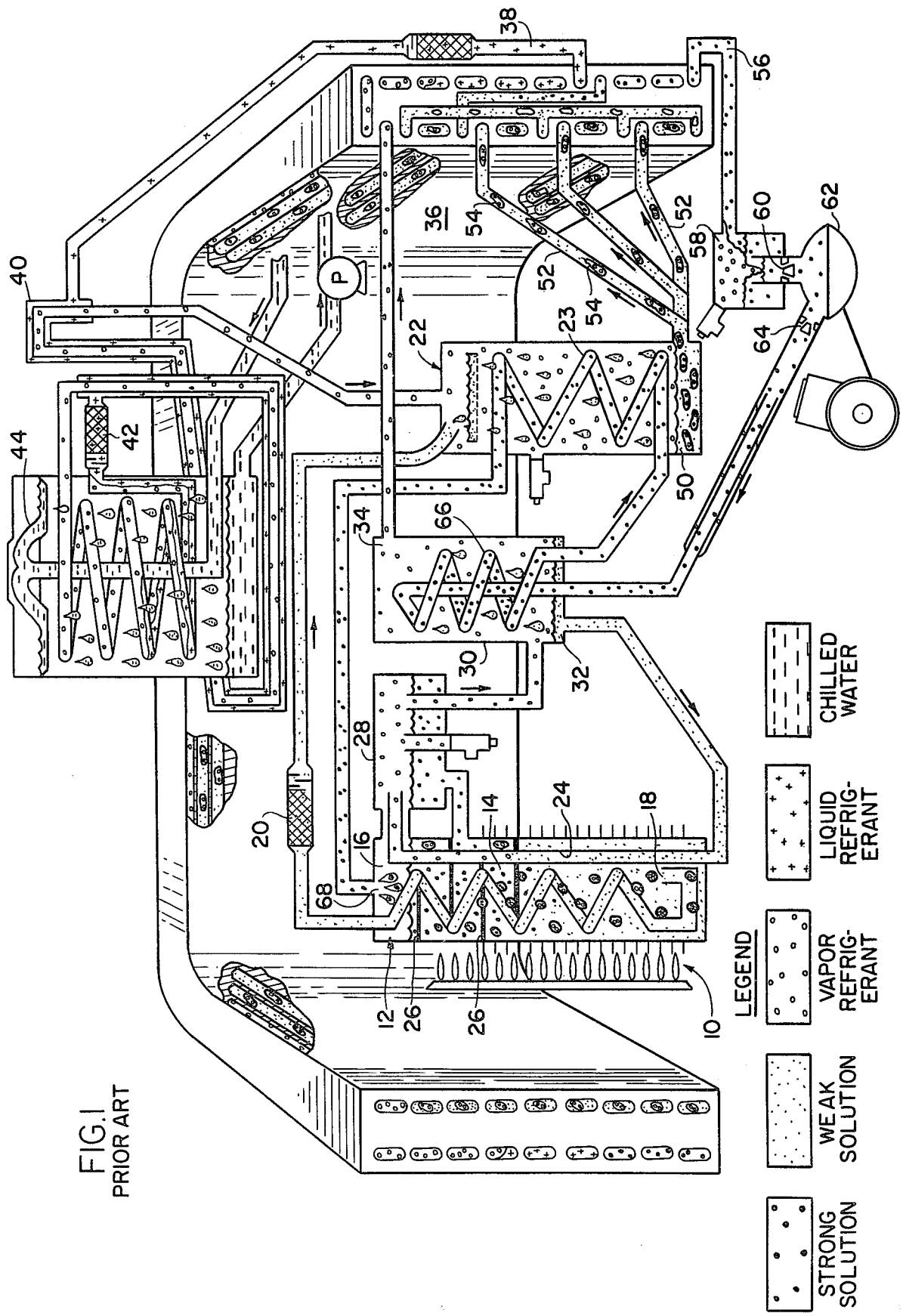
FIG. 1 is a flow diagram of an absorption refrigeration cycle using prior art components.

As shown in FIG. 1, and as will now be generally described, heat from gas burners 10 is applied to the generator 12 boiling the solution 14 therein. Ammonia-water vapor with a high ammonia content is driven out of the solution, leaving a weak aqueous ammonia liquid 18 (weak solution). This weak solution 18 leaves the generator, passes through a restrictor 20 and enters the solution cooled absorber 22. The rich ammonia vapor 16 passes upward through a chamber, called the analyzer 24, containing a series of baffles 26 which aid heat transfer between the vapor and liquid. This vapor passes through a solution leveling chamber 28 and into a gas-to-liquid heat exchanger called the rectifier 30, where the remaining water vapor portion of the mixture is condensed, leaving liquid water 32 to drain back to the generator by gravity.

Pure ammonia vapor 34 leaves the rectifier 30 and enters the condenser 36. A flow of air passing over the outside of the condenser causes the vapor to give up heat and change to a liquid 38. The pure ammonia liquid leaves the condenser, passes through a refrigerant heat exchanger 40, and enters the evaporator coil through strainers and restrictors 42.

Flowing over the outside of the evaporator coil is a stream of water 44 containing heat removed from the conditioned space. This water gives up heat to the ammonia liquid causing it (the ammonia) to vaporize. The resultant ammonia vapor flows out of the evaporator coil, through the refrigerant heat exchanger 40, and enters the solution cooled absorber 22.

The previously mentioned weak solution 18 entering the cooled absorber 22 is distributed over the outside of cooler strong solution coils 23. As the weak solution is cooled it absorbs some of the refrigerant vapor which fills the chamber. The weak solution collects in the bottom 50 and flows into the air cooled absorber coils 52. As this weak solution leaves the solution cooled absorber it entrains bubbles of regrigerant vapor 54 and carries them into the air cooled absorber. Passing through the absorber coils, the mixture of solution and entrained vapors is cooled, allowing all condensible vapors to be absorbed. Leaving the absorber the now strong liquid 56 enters the pump inlet chamber 58. It is drawn through a check valve 60 into the solution pump.

A diaphragm operated solution pump 62 forces the cool, strong solution through a check valve 64 to the rectifier coil 66. The strong solution picks up heat passing through the rectifier and the solution cooled absorber, returning pre-heated, as at 68, to the generator 12. A new cycle is now ready to begin.

Thus far, what has been described is well known, being, for example, embodied by the construction and operational mode of an air cooled chilling unit of Arkla Industries, Inc. of Evansville, Ind. What is novel and what constitutes the within invention, are the two embodiments of a substitute for the burners 10 and generator 12 shown in FIGS. 2-4, and now to be described in detail. However, prior to such description, still another prior art component should be acknowledged, namely a so-called radiant heater which, according to the present invention, is advantageously substituted as the source of heat for the burners 10.

It is already well known, as exemplified by U.S. Pat. No. 3,217,701, issued on Nov. 16, 1965, for "Radiant Heater", and which patent is herewith incorporated by reference in its entirety, that an optimum source of heat that can be used in heat exchange with a flowing fluid, such as water or the like, to heat a dwelling house or other structure is a so-called combustion element which is described in detail and illustrated in the referred-to patent. More particularly, as noted in column 1, lines 9–12 of said referred-to patent, there is considerable patent literature which discloses techniques for manufacture and use of a porous combustion element. Thus, subsequently in said referred-to patent, as at column 4, lines 7–15, it is noted that an optimum source of heat consists of said porous combustion element that in practice is operated by a combustible gas which is forced under pressure through the porous wall of said element. As a result, the outer surface of the element will sustain a combustion reaction at or adjacent the outer peripheral surface layer thereof, such as will cause the outer surface layer to incandesce.

Also noted in said U.S. Pat. No. 3,217,701, as at column 4, lines 63–67, is that in the operation of the referred-to combustion-operated combustion element, that there is an output therefrom in the form of hot exhaust gases possessing suitable energy in the form of convection heat, and also in the form of direct heat radiation radiating from the incandescent outer surface layer of the combustion element.

INVENTIVE COMBINATION

With the above understanding, it is the inventive contribution hereof to provide a highly efficient heat transfer to the refrigerant fluid of the absorption refrigeration cycle using a radiant heater and a uniquely designed generator or holding tank for the refrigerant fluid. The referred-to combination is best understood from FIGS. 2 and 3, to which reference should now be made and in which all mentioned aspects of the previously described absorption refrigeration cycle are designated by the same but primed reference numbers. Thus, the heat source is designated 10', but instead of being in the form of burners it is in the specific form of a cylindrically shaped porous combustion element 11 appropriately mounted in a central clearance position within a combustion chamber 13. Element 11 has communication with a source of combustible gas, as denoted by the arrow 15, which is forced under pressure into the combustion element 11 and through the porosity of its wall construction so that it radiates radially therefrom as noted by the arrows individually and collectively designated 17.

Figure 3:
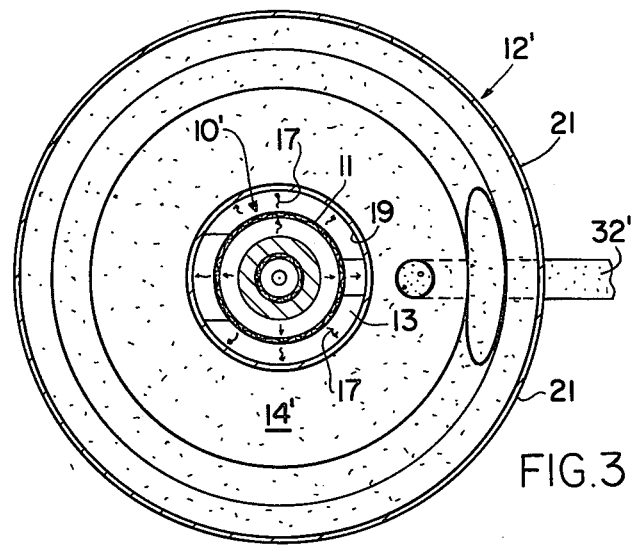
FIGS. 2, 3 and 4 illustrate substitutions for the structure shown in FIG. 1 which constitute the within invention. More particularly.
Figure 2:
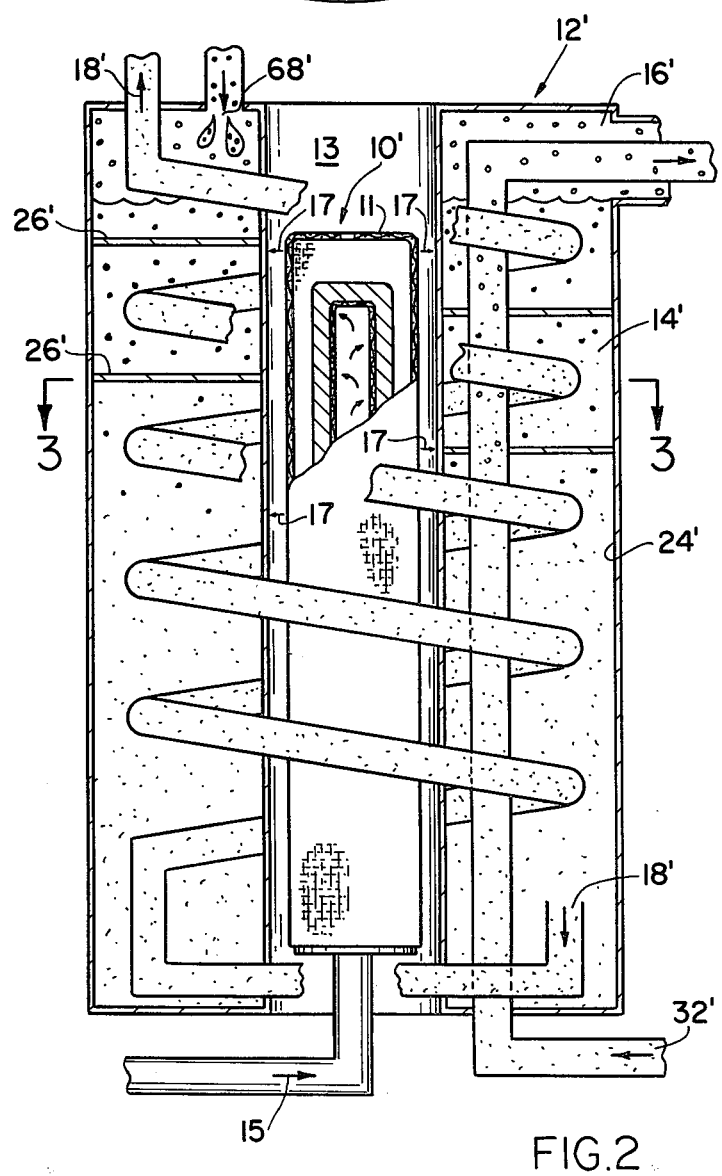

As understood and as described in detail in the referred-to U.S. Pat. No. 3,217,701, the operation of the combustion element 11 contemplates igniting the combustion gases 15 with the result that at, or near, the periphery of the surface of element 11 there is the referred-to combustion reaction that is manifested by incandescence. As a result, the radially flowing exhaust gases 17 are at an elevated temperature with which it is highly desirable to effectuate a heat transfer to the refrigerant fluid 14'. Additionally, the heat generated by the incandescing surface of the screen 10' and reactor 11 is circumferential in nature, in that the generated heat emanates outwardly through 360° from the surfaces 10' and 11 and as a result transfer heat advantageously to the refrigerant 14' which is in encircling relation about the centrally located reactor 10'. To achieve the optimum heat transfer from the heat generated by the reactor 10' to the refrigerant fluid 14' in the manner just described, use is made of a unique design in the generator 12'. More particularly, and as best shown in FIGS. 2 and 3, the design is one that is essentially a doughnut-shape in which the previously noted combustion chamber 13 is located centrally of the generator 12'. More particularly, chamber 13 is bounded by an inner cylindrical wall 19 which cooperates with an external wall 21 to bound therebetween the storage compartment 24', or so-called analyzer, which contains the volume of refrigerant fluid 14' which is used in the absorption refrigeration cycle.

From the foregoing description it should be readily appreciated that optimum use has been made of the reactor of U.S. Pat. No. 3,217,701, in which the generated heat is of a circumferential nature, as described, by the use of a holding tank or generator 12' having a unique doughnut shape in which the reactor 10' has an operative position located in the central opening or compartment of the generator 12'. As a result it has been found in practice that there is a highly efficient transfer of heat from the reactor 10' to the refrigerant fluid 14' which correspondingly results in greater efficiency in the refrigeration which is produced by the absorption refrigeration cycle described in connection with FIG. 1. To a significant extent this greater efficiency in heat transfer is due not only to the fact that the refrigerant surrounds the reactor 10', but also because the heat is generated in the confines of the chamber 13 so that heat is reflected back and forth between the cylindrical wall 19 until it is absorbed by the refrigerant fluid 14'.

Figure 4:
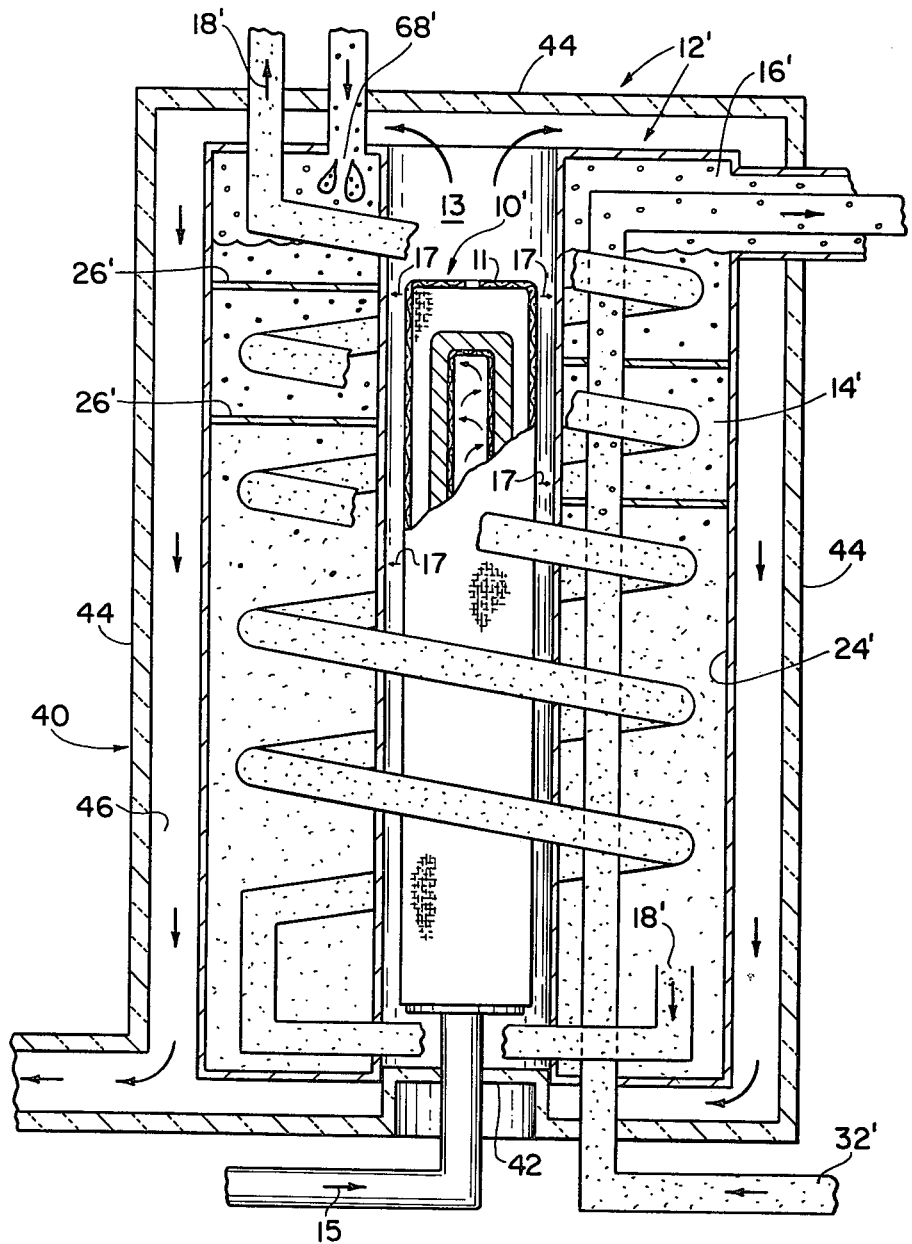

Referring now to a second improved embodiment of a generator according to the present invention, as illustrated in FIG. 4, it will be understood that it consists of many components already described in connection with FIGS. 2 and 3. These commponents are designated by the same reference numerals. The addition to FIG. 4 is an insulated jacket 40 having a central wall 42 serving as a plug for the bottom of the combustion chamber 13 and side and top walls 44 in a clearance position about the generator 12' to define exit passageways 46 for the hot exhaust gases 17. In the FIG. 4 embodiment therefor, there is additional heat exchange between the exiting exhaust gases 17 and the refrigerant 14'.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. For use in an absorption refrigeration cycle of the type having an operational mode in which there is transfer of heat resulting from the combustion of an air-gas fuel mixture to a refrigerant fluid, an improved generator for achieving said heat transfer comprising, in combination, a housing constructed of a cooperating pair of external and internal walls bounding a compartment therebetween serving as a storage tank for a body of said refrigerant fluid, and said internal wall being located centrally of said storage tank and being of a cylindrical shape to bound a correspondingly cylindrically-shaped internal compartment serving as a combustion chamber within said body of refrigerant fluid, and a cylindrically-shaped combustion unit having a hollow core and of the type fueled by an air-gas mixture of an appropriate selected size and having an operative position disposed in said internal combustion chamber for transmitting heat to said refrigerant fluid in said storage tank, said combustion unit being formed of a fibrous construction material bounding said hollow core and having a porosity effective to permit said air-gas mixture to pass from said hollow core radially therefrom to an exterior surface thereof so as to support a catalytic combustion of said air-gas mixture at said external surface, whereby the flow of heat from said combustion unit is directed circumferentially therefrom as heat radiated from said external surface and also as hot gases issuing therefrom, and is thereby efficiently transferred to said fluid contents of said storage tank which is in encircling relation about said combustion unit.

2. An improved absorption refrigeration cycle generator as claimed in claim 1 wherein said external housing wall is of a similar cylindrical shape as said internal housing wall.

3. An improved absorption refrigeration cycle generator as claimmed in claim 2 wherein said generator is vertically oriented and said combustion unit is disposed through a bottom opening into said centrally located combustion chamber.

4. An improved absorption refrigeration cycle generator as claimed in claim 3 including an insulated jacket in surrounding relation about said generator and having a top and side walls in a clearance position therefrom to define an exit passage for said air-gas fuel mixture, to thereby prolong the heat exchange between said air-gas fuel mixture and said refrigerant fluid.

* * * * *